United States Patent
Fink et al.

(10) Patent No.: US 8,084,161 B2
(45) Date of Patent: Dec. 27, 2011

(54) COMBINED ACCUMULATOR AND DEMINERALIZER FUNCTIONALITY FOR A FUEL CELL

(75) Inventors: Garrett W. Fink, Rocky Hill, CT (US); Jennifer M. Kurtz, Vernon, CT (US); Praveen Narasimhamurthy, Vernon, CT (US); Craig E. Evans, Manchester, CT (US)

(73) Assignee: UTC Power Corporation, South Windsor, CT (US)

(*) Notice: Subject to any disclaimer, the term of this patent is extended or adjusted under 35 U.S.C. 154(b) by 1765 days.

(21) Appl. No.: 11/433,075

(22) Filed: May 12, 2006

(65) Prior Publication Data

US 2006/0275640 A1  Dec. 7, 2006

Related U.S. Application Data

(63) Continuation-in-part of application No. 11/025,434, filed on Dec. 28, 2004, now abandoned.

(51) Int. Cl.
*H01M 4/00* (2006.01)
*H01M 8/04* (2006.01)

(52) U.S. Cl. ........ 429/400; 429/428; 429/433; 429/434; 429/436; 429/440

(58) Field of Classification Search ............ 429/12, 429/400, 428, 433, 434, 436, 440; 210/188, 210/150, 285, 263
See application file for complete search history.

(56) References Cited

U.S. PATENT DOCUMENTS

| | | | |
|---|---|---|---|
| 3,503,513 A | | 3/1970 | Kryzer et al. |
| 3,795,544 A | | 3/1974 | Clausi et al. |
| 4,039,444 A | * | 8/1977 | Bory et al. ............ 210/679 |
| 4,973,529 A | * | 11/1990 | Grasso et al. ............ 429/400 |
| 5,346,778 A | | 9/1994 | Ewan et al. |
| 5,366,818 A | * | 11/1994 | Wilkinson et al. ............ 429/13 |
| 6,242,118 B1 | | 6/2001 | Grasso et al. |
| 6,368,737 B1 | | 4/2002 | Margiott et al. |
| 6,416,892 B1 | | 7/2002 | Breault |
| 6,428,916 B1 | * | 8/2002 | Grasso et al. ............ 429/410 |
| 6,451,466 B1 | | 9/2002 | Grasso et al. |
| 6,656,622 B2 | | 12/2003 | Grasso |
| 6,787,255 B2 | * | 9/2004 | Misumi ............ 429/408 |
| 2002/0110714 A1 | | 8/2002 | Andrews et al. |
| 2003/0205213 A1 | | 11/2003 | Aquino et al. |
| 2004/0197622 A1 | * | 10/2004 | Wheat et al. ............ 429/22 |

OTHER PUBLICATIONS

International Search Report for International Application No. PCT/US05/43160 dated Oct. 12, 2006.
Written Opinion of the International Searching Authority for International Application No. PCT/US05/43160 dated Oct. 12, 2006.
The Plenum Chemical Engineering Series, "Engineering Flow and Heat Exchange," Revised Edition, Octave Levenspiel, pp. 197-204.

* cited by examiner

*Primary Examiner* — Helen O Conley
(74) *Attorney, Agent, or Firm* — Carlson, Gaskey & Olds PC

(57) ABSTRACT

A fuel cell power plant assembly includes an accumulator having a housing. In one example, at least one demineralizer portion is positioned to interact with fluid within the accumulator housing. This allows for warm fluid within the accumulator housing to provide heat to the demineralizer portion. In one example, the demineralizer portion is within the housing. Another example includes a separator supported within the housing of the accumulator. A disclosed example includes a conical shaped baffle as the separator. The separator separates liquid from gas and facilitates distributing fluid flow within the accumulator housing to provide increased heat exchange with the demineralizer portion within the housing.

8 Claims, 3 Drawing Sheets

US 8,084,161 B2

COMBINED ACCUMULATOR AND DEMINERALIZER FUNCTIONALITY FOR A FUEL CELL

CROSS REFERENCE TO RELATED APPLICATION

This application is a continuation-in-part of U.S. application Ser. No. 11/025,434, which was filed on Dec. 28, 2004 now abandoned.

FIELD OF THE INVENTION

This invention generally relates to fuel cells. More particularly, this invention relates to demineralizers and accumulators for use with fuel cells.

DESCRIPTION OF THE RELATED ART

Fuel cell power plants are known. One known arrangement is schematically shown in FIG. 1. Cooler plates 8 are within a fuel cell stack assembly 9 and receive coolant through a conduit 10 from an accumulator 11. The outflow from the cooler plates 8 flows through a conduit 15 to a separator 16, which has a vent 17 such as an atmospheric vent, that removes entrained gas from the coolant water. The conduit 22 provides the coolant to the input of a cooling pump 23, the outflow of which flows through a conduit 24 that delivers the coolant to a heat exchanger 25. When a fuel cell power plant is operating, the heat exchanger will dissipate some of the heat to maintain the coolant water temperature reentering the cooler plates 8 at a suitable temperature. The heat exchanger may typically include a fan utilizing atmospheric air as the cooling medium, and may have a thermostatically controlled bypass, all as known.

The coolant passes through conduits 29 and 31 to the accumulator 11. A flow restrictor 30 allows balancing the flow of water between the accumulator and a demineralizer 33. In some configurations, the flow restriction may be in the conduit 32. The demineralizer 33 contains a large mass of conventional demineralizing resin so as to reduce the amount of suspended and dissolved solids from the exhausted coolant.

Fuel cell power plants with demineralizers are disclosed in U.S. Pat. Nos. 6,368,737; 6,428,916; and 6,656,632.

At temperatures below the freezing temperature of water, even though a bulk of the water system is thawed and water is flowing and becoming warmed by process heat within the cell stack assembly 9, the large thermal mass of the resin in the demineralizer, coupled with a very low flow of water through the demineralizer, cause the water flowing into the demineralizer to flash freeze, and block any further flow. Thus, the demineralizer takes an extremely long time to thaw, perhaps hours.

In order to accommodate the large, cold mass of the demineralizer 33, it is common to provide a heater 36 on the external surface of the demineralizer or in some other way to heat the mass of the resin within the demineralizer.

The heat required to raise the mass of the demineralizer to a temperature above the freezing point of water is significant and constitutes an excessive parasitic power drain. In vehicular applications, where an electric motor is driven by a fuel cell power plant, space is at a premium and parasitic power must be kept to a minimum since the storage of fuel must be minimized. The total water volume in a vehicular system should be minimized, also.

During start-up, before adequate flow is established in the demineralizers, the water may become more and more conductive, thereby reducing useful power that is generated.

There are various disadvantages associated with known demineralizer arrangements as described above. It would be useful to provide an improved arrangement that provides an ability to heat demineralizer resin without requiring an external heat source. It would also be useful to provide a system having reduced packaging constraints compared to known arrangements. This invention addresses those needs.

SUMMARY OF THE INVENTION

An exemplary device for use in a fuel cell power plant includes an accumulator having a housing. At least one demineralizer portion is in the housing so that heat from fluid within the housing warms the demineralizer portion.

One example includes a plurality of demineralizer portions in the housing. Including more than one demineralizer portion increases the surface area for heat transfer contact with warm fluid in the housing.

One example includes a separator in the housing to direct fluid flow in a desired manner. The separator facilitates separating liquid from gas in fluid flowing in the housing.

One example separator comprises a conical baffle.

One example includes a bag of water-permeable material as the exterior of the demineralizer portion.

The various features and advantages of this invention will become apparent to those skilled in the art from the following detailed description. The drawings that accompany the detailed description can be briefly described as follows.

DETAILED DESCRIPTION

Disclosed examples described below provide the advantage of integrating the accumulator and demineralizing functions associated with a fuel cell power plant into a single device. By incorporating the demineralizer function into an accumulator device in a manner such as that used for the described examples, heat associated with fluid in the accumulator now becomes a heat source for the demineralizer resin and a reduced size of the arrangement provides packaging efficiencies.

Figure 1:
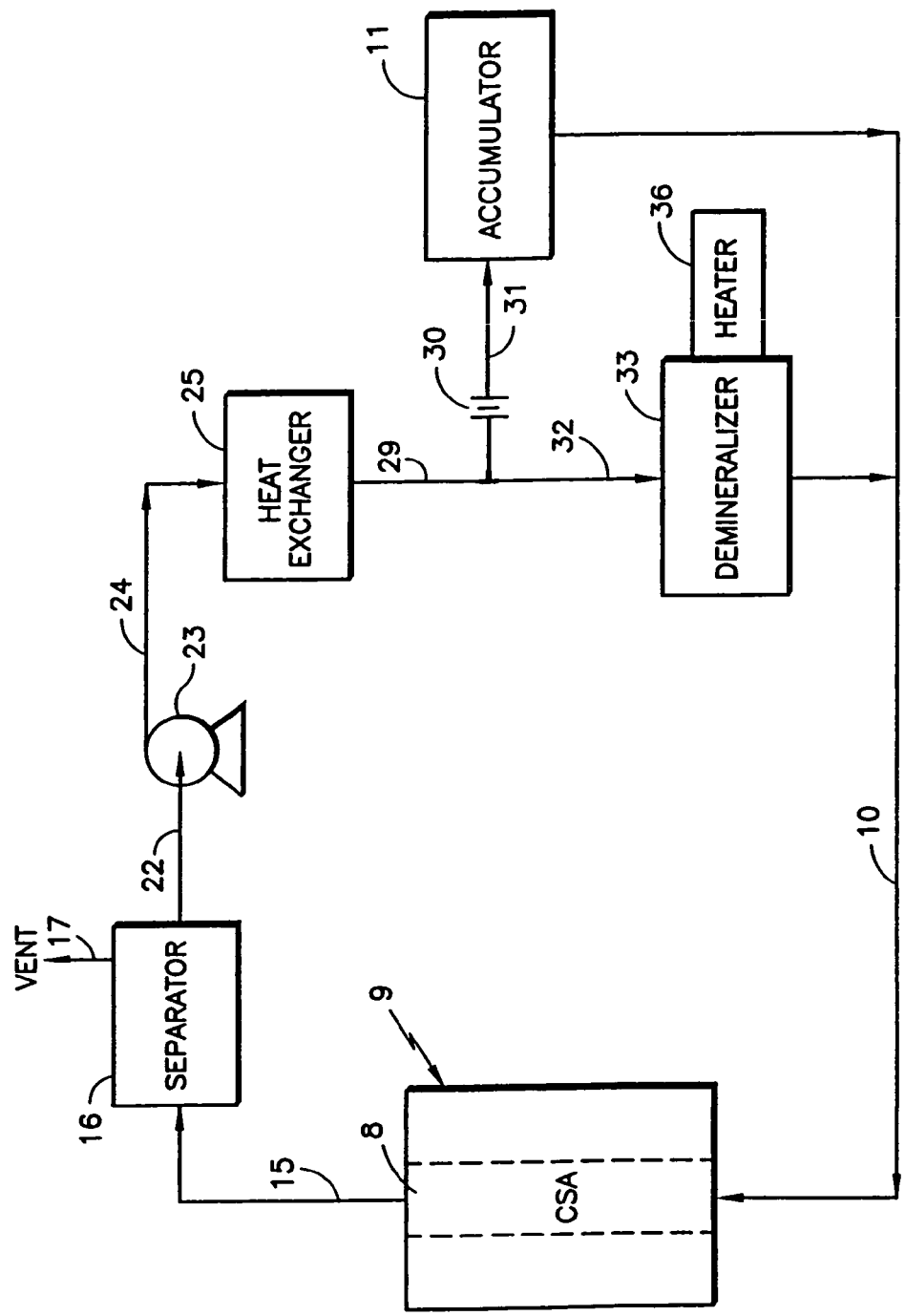
FIG. 1 is a schematic illustration of a fuel cell power plant having a demineralizer that is separate from an accumulator as known in the prior art.
Figure 2:
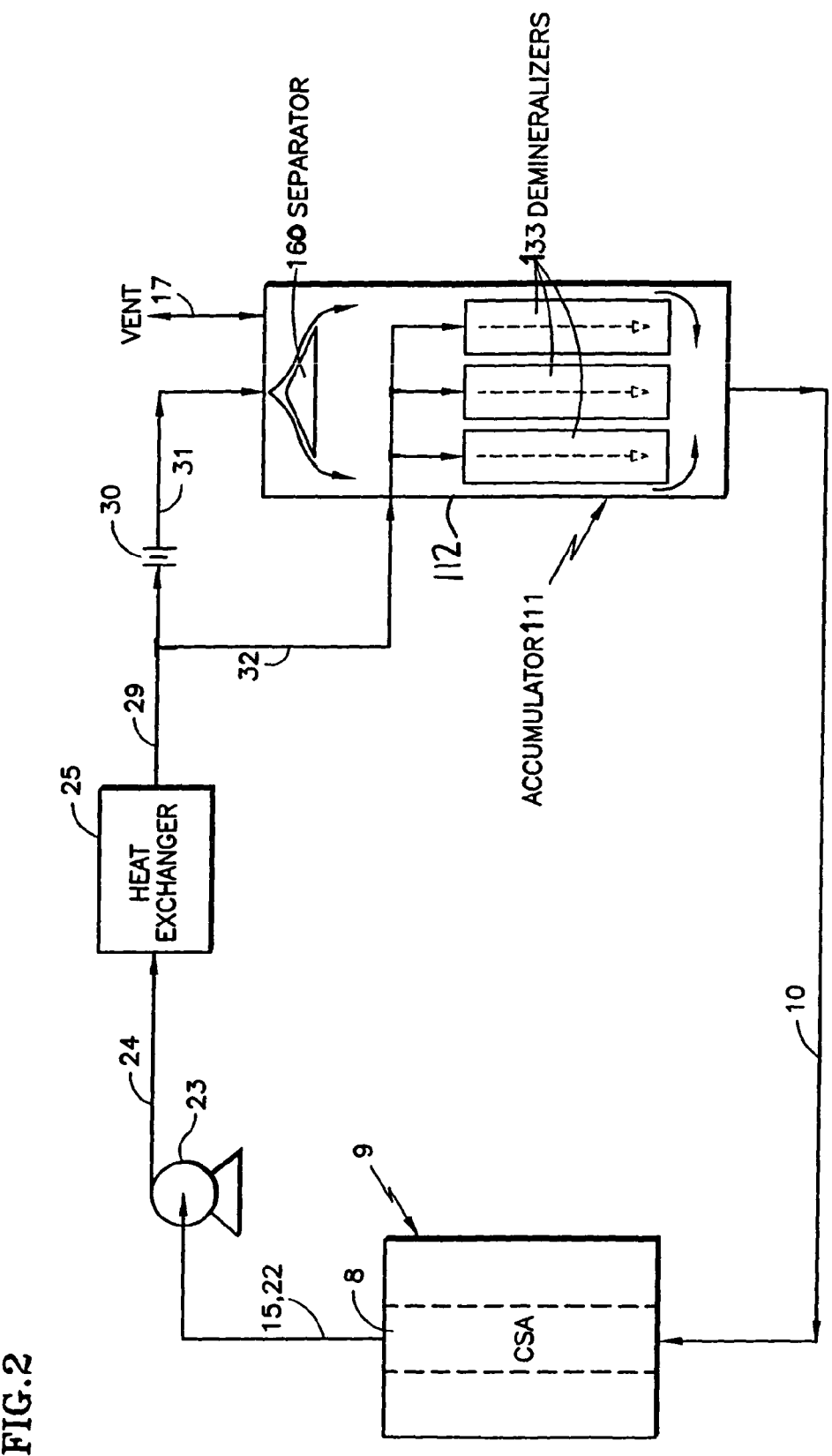
FIG. 2 is a schematic diagram of a fuel cell power plant designed according to an example embodiment of this invention.

FIG. 2 shows one example fuel cell power plant assembly including an accumulator 111 that performs the functions of known accumulators within fuel cell assemblies. Accumulators are used to sometimes store fluid from within the coolant loop for regulating the supply of coolant to the fuel cell assembly, and to regulate the product water generated by the electrochemical reaction. In this example, a housing 112 of the accumulator contains or supports a plurality of demineralizer portions 133. Coolant, which flows into the accumulator 111 from the fuel cell stack assembly 9 contains heat. Having the demineralizer portions 133 within the accumulator 111 allows for the heat from the coolant in the accumulator to be used for heating up the demineralizing resin of the demineralizer portions 133. In situations where the demineralizer portions may have been frozen, such heat allows for thawing the demineralizer portions and restoring flow as desired.

The illustrated example includes a plurality of demineralizer portions 133, which increases the overall surface area of the demineralizer for increased heat transfer to the demineralizer resin as the coolant flows through the accumulator 111. Providing multiple demineralizer portions as schematically shown further enhances efficiencies as more surface area is available for heat transfer to the demineralizing resin to increase the speed at which the demineralizer may be thawed, for example.

One example includes internal baffles associated with the demineralizer portions 133 to reduce fluid slosh within the accumulator housing 112 during motion of the fuel cell power plant assembly. This is useful, for example, with embodiments where the fuel cell power plant is incorporated onto a vehicle.

The illustrated example includes a separator 160 that comprises a baffle in one example. The illustrated example includes a conical baffle. As the coolant flows into the accumulator 111, the separator 160 disburses or spreads the flow of the coolant to distribute it in a desired manner through the accumulator 111. In one example, the separator 160 effectively distributes the coolant in a generally equal manner throughout the housing 112 or flow passages within the housing 112, depending on the particular embodiment. The separator 160 facilitates separating liquid from gas in the fluid entering the accumulator 111. A vent 17 is included for allowing gases to escape from the accumulator housing 112.

Another example includes a separator 160 that effectively sprays the coolant into appropriate portions of the accumulator 111.

One advantage of the illustrated example is that space savings are provided because the demineralizer portions 133 are contained within the accumulator 111. Further space savings are provided by this example because the separator 160 is contained within the accumulator 111. Such an arrangement allows for packaging economies that were not possible with previous arrangements where a separate and distinct separator unit, demineralizer and accumulator, respectively, are used.

In the illustrated example, a flow restrictor 30 and fluid conduits 29, 31 and 32, are positioned outside of the accumulator housing 112. In another example, such components are accommodated within the structure of the accumulator 111. By consolidating various portions of the assembly into the accumulator 111, less overall plumbing is required and that reduces the water volume of the assembly. Lower water volume corresponds to less ice formation during freezing conditions, which reduces the energy requirements for thawing ice during a start up, for example. Additionally, removing some of the plumbing and water traps typically associated with fuel cell power plant assemblies simplifies the possible shutdown strategies for such an arrangement.

One example shutdown process includes draining the accumulator 111 and demineralizer portions 133 during shutdown. Upon start up, heat associated with the coolant flowing through the accumulator 111 is provided, at no additional energy cost, to the demineralizer portions 133, which can effectively melt any flash freezing that might occur upon recirculation of coolant, for example.

In one example, at least one of the demineralizer portions 133 is a so-called tea bag demineralizer. Known water-permeable materials are used for making an exterior in a pouch or bag configuration for such demineralizers. In one example, the demineralizer portions 133 are operated at a high temperature because that is beneficial to the tea bag style demineralizer performance. Positioning a tea bag style demineralizer within an accumulator allows for increased hot water turbulence and better mixing because the fluid flowing through the accumulator 111 is hot.

Figure 3:
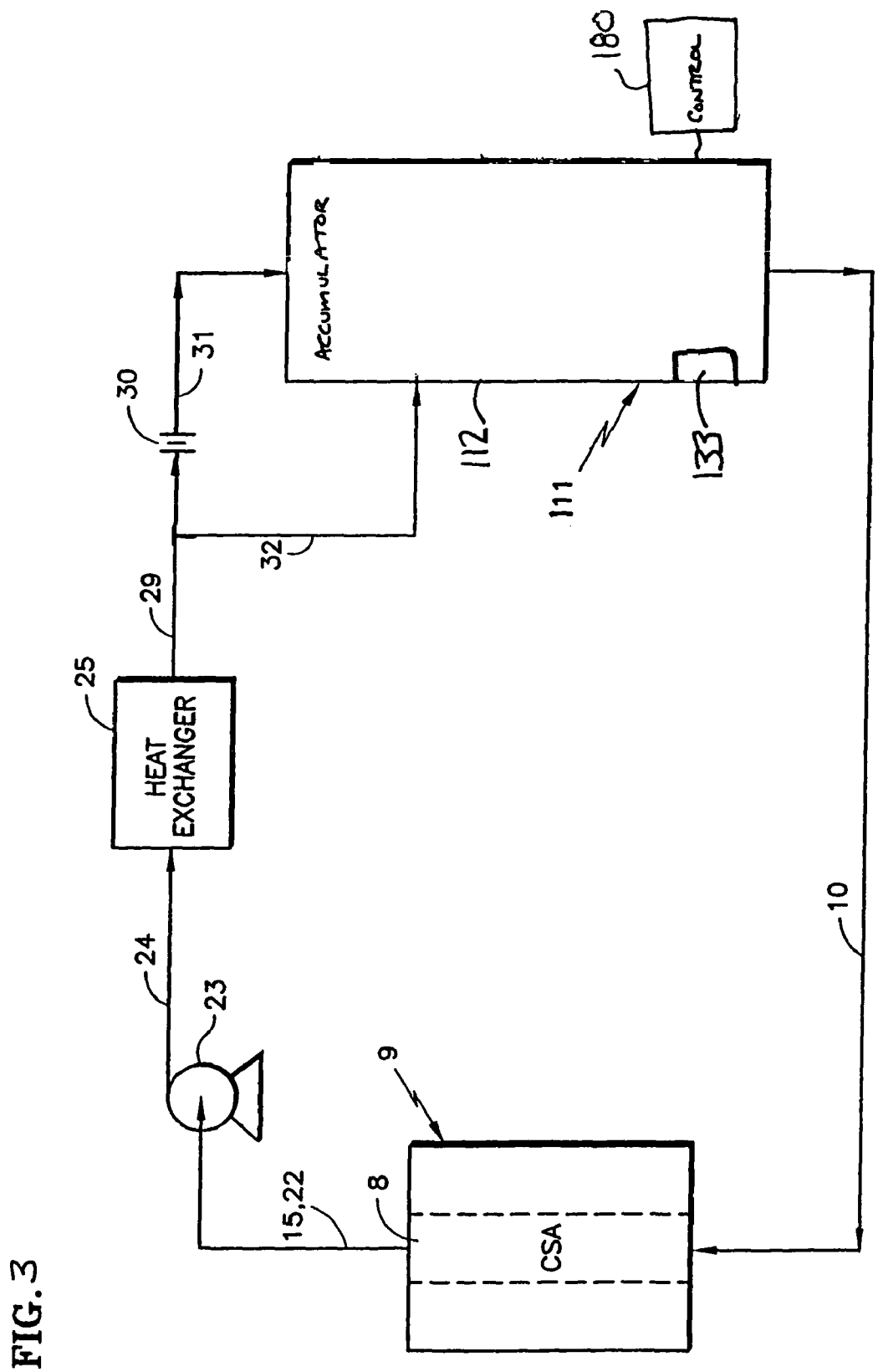
FIG. 3 is a schematic diagram of a fuel cell power plant designed according to another example embodiment of this invention.

Another example is shown in FIG. 3. This example includes a demineralizer 133 that has a tea bag style exterior. No separator 160 is used in this example within the accumulator 111. The demineralizing action of the resin in the demineralizer 133 is possible without requiring active fluid flow through the accumulator housing 112. Instead, hot fluid is used to achieve demineralization. If there is sufficient heat in the fluid, there is enough convective energy to achieve interaction between the demineralizing resin and the fluid for at least some situations.

The example of FIG. 3 includes a controller 180 configured to ensure that the temperature of fluid contacting the tea bag style demineralizer 133 is maintained at or above a selected temperature to achieve a desired level of demineralizer performance even when there is no active fluid flow. In many circumstances, the fluid will already be at a sufficiently high temperature. In some examples, supplemental heat may be introduced when the controller 180 determines that the fluid temperature is lower than desired.

In one example, using a fluid temperature on the order of 90° C. for interacting with the demineralizer (e.g., resin and fluid interaction) provides a conductivity level associated with at least initial use of the demineralizer portion that is on the order of 1.5 times the conductivity associated with using a fluid temperature of approximately 25° C. The increased conductivity level facilitates the demineralizing action of the resin.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A fuel cell power plant assembly, comprising
a fuel cell stack from which heated fluid flows during operation of the fuel cell stack, the heated fluid containing at least some heat that results from operation of the fuel cell stack;
an accumulator having an inlet in fluid communication with the fuel cell stack such that the heated fluid from the fuel cell stack enters the accumulator inlet, the accumulator having an outlet and a housing for at least temporarily containing the heated fluid before the fluid exits the housing through the outlet; and
at least one demineralizer portion positioned to interact with heated fluid within the housing before the fluid exits the outlet such that the heated fluid within the housing provides heat to the demineralizer portion, wherein the at least one demineralizer portion has an exterior comprising a bag of a water permeable material.

2. The assembly of claim 1, comprising a plurality of demineralizer portions within the housing.

3. A fuel cell power plant assembly, comprising
a fuel cell stack from which heated fluid flows during operation of the fuel cell stack, the heated fluid containing at least some heat that results from operation of the fuel cell stack;
an accumulator having an inlet in fluid communication with the fuel cell stack such that the heated fluid from the fuel cell stack enters the accumulator inlet, the accumulator having an outlet and a housing for at least temporarily containing the heated fluid before the fluid exits the housing through the outlet;

at least one demineralizer portion positioned to interact with heated fluid within the housing before the fluid exits the outlet such that the heated fluid within the housing provides heat to the demineralizer portion; and a separator associated with the accumulator for distributing a flow of fluid flowing into the housing in a plurality of directions within the housing, the separator being associated with the inlet of the accumulator such that the flow of fluid is distributed by the separator before the fluid interacts with any demineralizer portion in the accumulator.

4. The assembly of claim 3, wherein the separator comprises a baffle supported within the housing near the inlet to the housing.

5. The assembly of claim 4, wherein the separator comprises a conical baffle having a contour shaped to direct fluid incident on the conical baffle in the plurality of directions within the housing.

6. The assembly of claim 1, wherein the heated fluid has a temperature of approximately 90° C.

7. A fuel cell power plant assembly, comprising
a fuel cell stack from which heated fluid flows during operation of the fuel cell stack, the heated fluid containing at least some heat that results from operation of the fuel cell stack;

an accumulator having an inlet in fluid communication with the fuel cell stack such that the heated fluid from the fuel cell stack enters the accumulator inlet, the accumulator having an outlet and a housing for at least temporarily containing the heated fluid before the fluid exits the housing through the outlet; and at least one demineralizer portion positioned to interact with heated fluid within the housing before the fluid exits the outlet such that the heated fluid within the housing provides heat to the demineralizer portion, wherein the heated fluid has a temperature of approximately 90° C., wherein the at least one demineralizer portion has an exterior comprising a bag of water permeable material and the housing and demineralizer are configured to allow the heated fluid to interact with the at least one demineralizer portion at a location in the housing where there is substantially no active fluid flow.

8. The assembly of claim 1, wherein the heated fluid is used to at least partially thaw any frozen contents of the at least one demineralizer portion in the accumulator.

\* \* \* \* \*